(12) United States Patent
Ozawa

(10) Patent No.: US 9,626,605 B2
(45) Date of Patent: Apr. 18, 2017

(54) IMAGE PROCESSING APPARATUS, INFORMATION PROCESSING METHOD, AND STORAGE MEDIUM FOR PROCESSING RENDERING DATA INCLUDING A PIXEL PATTERN FOR REPRESENTING A SEMITRANSPARENT OBJECT

(71) Applicant: CANON KABUSHIKI KAISHA, Tokyo (JP)

(72) Inventor: Shuji Ozawa, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 453 days.

(21) Appl. No.: 14/243,781

(22) Filed: Apr. 2, 2014

(65) Prior Publication Data

US 2014/0300622 A1    Oct. 9, 2014

(30) Foreign Application Priority Data

Apr. 4, 2013    (JP) ................................ 2013-078433

(51) Int. Cl.
*G06K 15/02* (2006.01)
*H04N 1/38* (2006.01)
*H04N 1/387* (2006.01)
*G06T 11/60* (2006.01)
*H04N 1/32* (2006.01)

(52) U.S. Cl.
CPC ..... *G06K 15/1822* (2013.01); *G06K 15/1851* (2013.01); *G06K 15/1852* (2013.01); *G06T 11/60* (2013.01); *H04N 1/32309* (2013.01); *H04N 1/38* (2013.01); *H04N 1/387* (2013.01)

(58) Field of Classification Search
None
See application file for complete search history.

(56) References Cited

U.S. PATENT DOCUMENTS

| | | | | |
|---|---|---|---|---|
| 7,095,527 B2* | 8/2006 | Ahrens | ................... | G06K 15/00 358/1.18 |
| 7,257,352 B2* | 8/2007 | Yamada | ............. | G06K 15/1852 358/444 |
| 8,139,263 B2* | 3/2012 | Hauser | ............... | G06K 15/1848 358/1.9 |
| 8,289,560 B2* | 10/2012 | Mizutani | ............ | G06K 15/1852 358/1.18 |

(Continued)

FOREIGN PATENT DOCUMENTS

JP    2007-118199 A    5/2007
JP    2010-220158 A    9/2010

*Primary Examiner* — Scott A Rogers
(74) *Attorney, Agent, or Firm* — Canon U.S.A., Inc. IP Division

(57) ABSTRACT

An apparatus includes a determination unit configured to determine whether rendering positions of two pieces of rendering data, each representing a semitransparent state by including pixels that are to be rendered by a rendering unit and pixels that are not to be rendered, overlap, and a control unit configured to, if it is determined by the determination unit that the rendering positions of the two pieces of rendering data overlap, perform control such that one of the two pieces of rendering data is not rendered by the rendering unit. Based on the level of the overlap between a plurality of semitransparent objects, the apparatus converts each hatch pattern so that image quality deterioration does not occur.

16 Claims, 15 Drawing Sheets

(56) References Cited

U.S. PATENT DOCUMENTS

| | | | | |
|---|---|---|---|---|
| 8,675,248 B2* | 3/2014 | Matsushita | H04N 1/32309 358/1.9 |
| 9,025,189 B2* | 5/2015 | Sonogi | G06K 15/1865 358/1.15 |
| 2011/0286672 A1* | 11/2011 | Yamanaka | H04N 1/4092 382/199 |
| 2012/0050765 A1* | 3/2012 | Mori | G06K 15/1868 358/1.9 |
| 2014/0085681 A1* | 3/2014 | Jung | H04N 1/3871 358/3.01 |
| 2015/0248598 A1* | 9/2015 | Mori | G06K 15/1849 358/1.13 |

* cited by examiner

WARNING

OVERLAP OF SEMITRANSPARENT OBJECT HAS BEEN DETECTED.
PRINT DEFECT MAY BE REMEDIED BY PERFORMING THE FOLLOWING PROCESSING.
· ELIMINATING OVERLAP OF SEMITRANSPARENT OBJECT
· RELEASING MODIFICATION DESIGNATION OF OBJECT WITH AN APPLICATION

CONTINUE PRINTING?

| CANCEL | CONTINUE |

DEGREE OF TRANSPARENCY = ALL OFF PIXELS / ALL PIXELS
= 180 ÷ 256 = 0.7031 ... = 70%

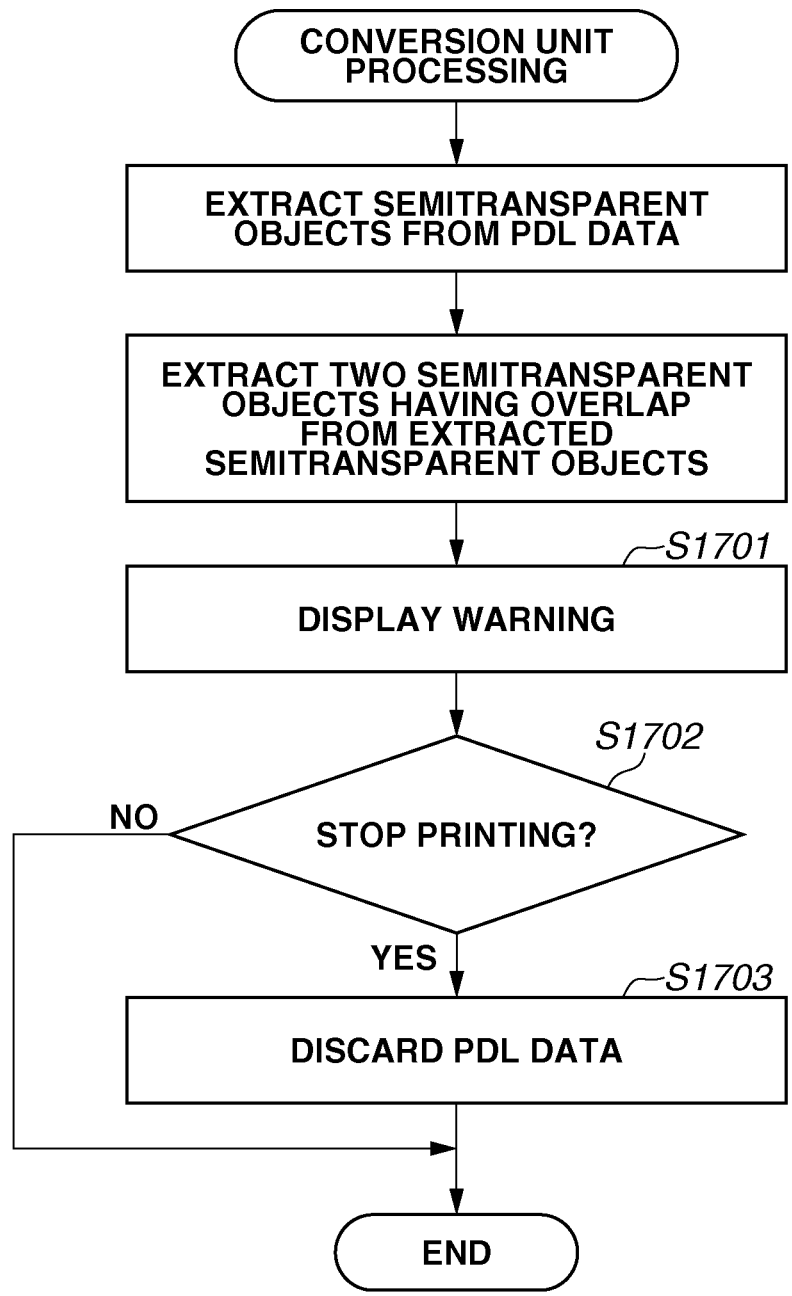

PERIOD OF HATCH PATTERNS MATCHES

HATCH PATTERNS ARE OUT OF
PHASE IN HORIZONTAL DIRECTION

HATCH PATTERNS ARE OUT OF
PHASE IN VERTICAL DIRECTION

HATCH PATTERNS ARE OUT OF PHASE IN BOTH
HORIZONTAL DIRECTION AND VERTICAL DIRECTION

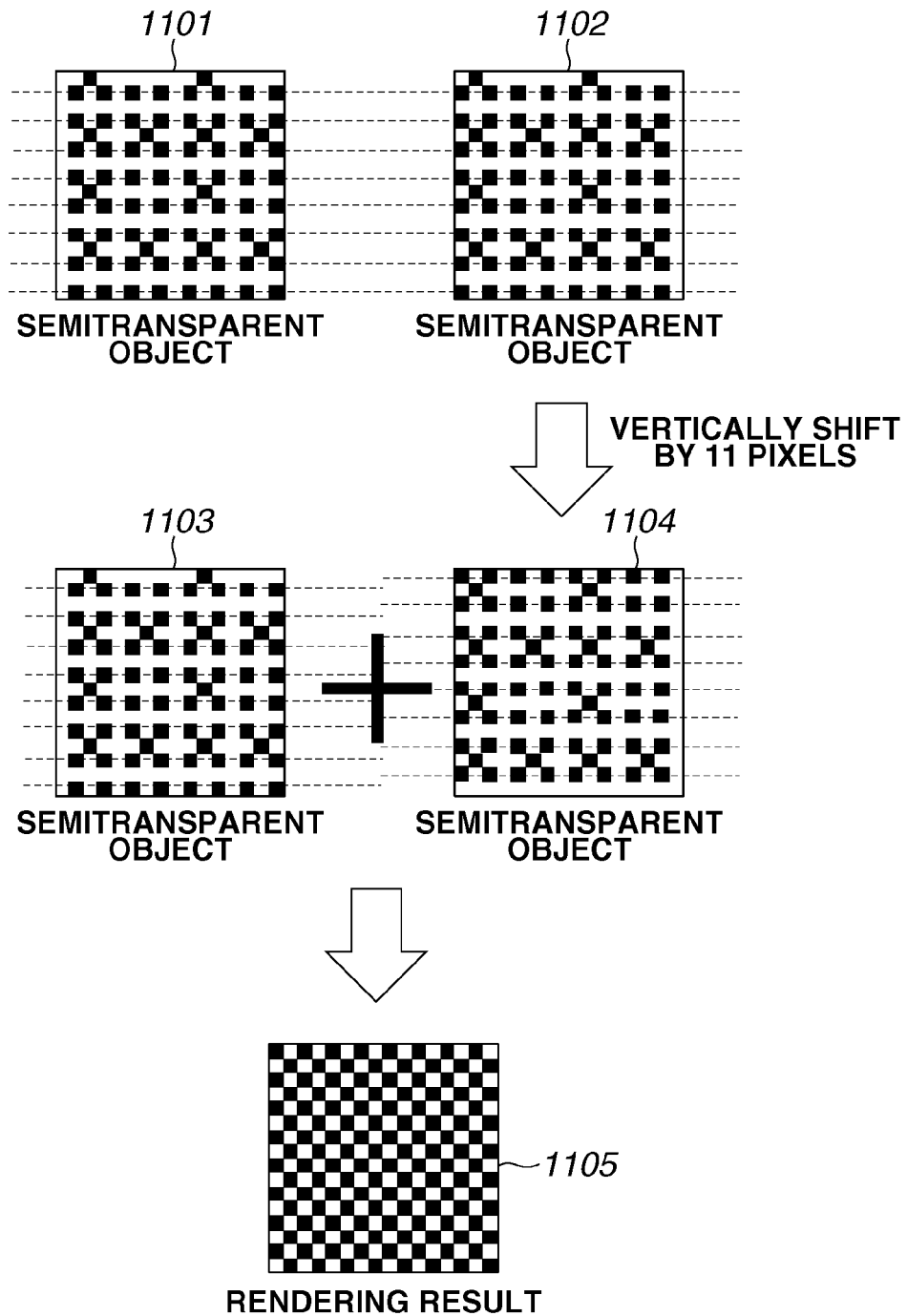

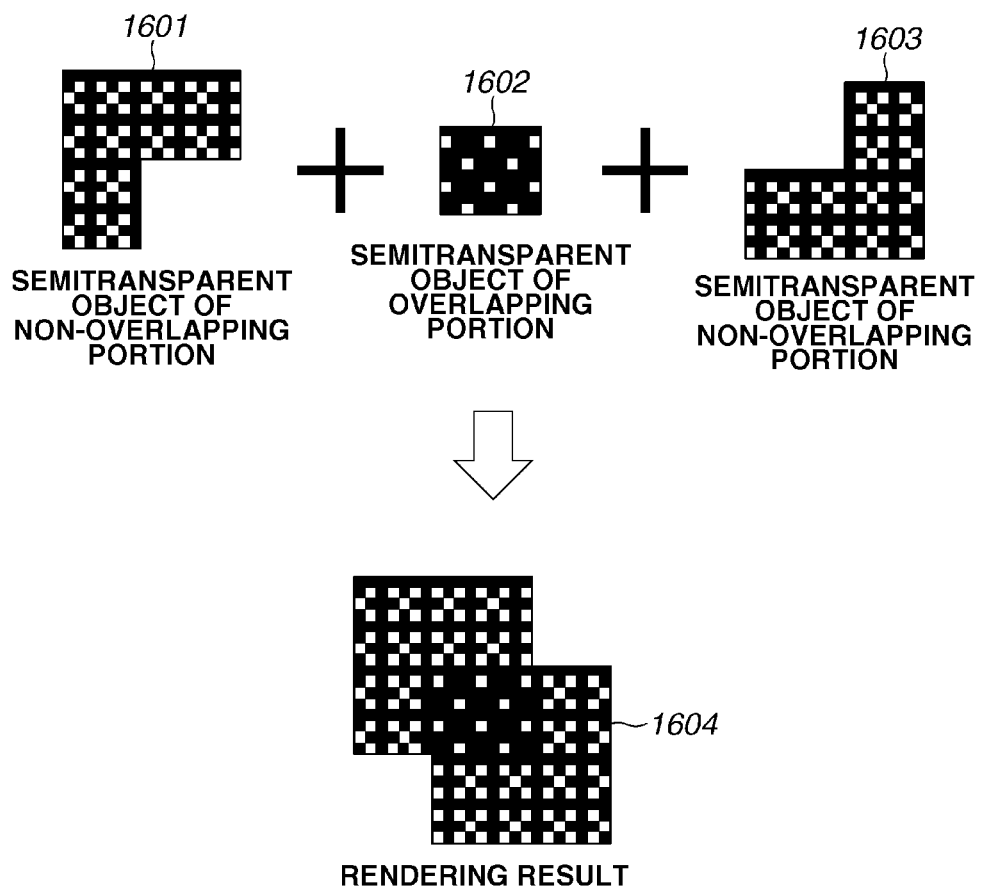

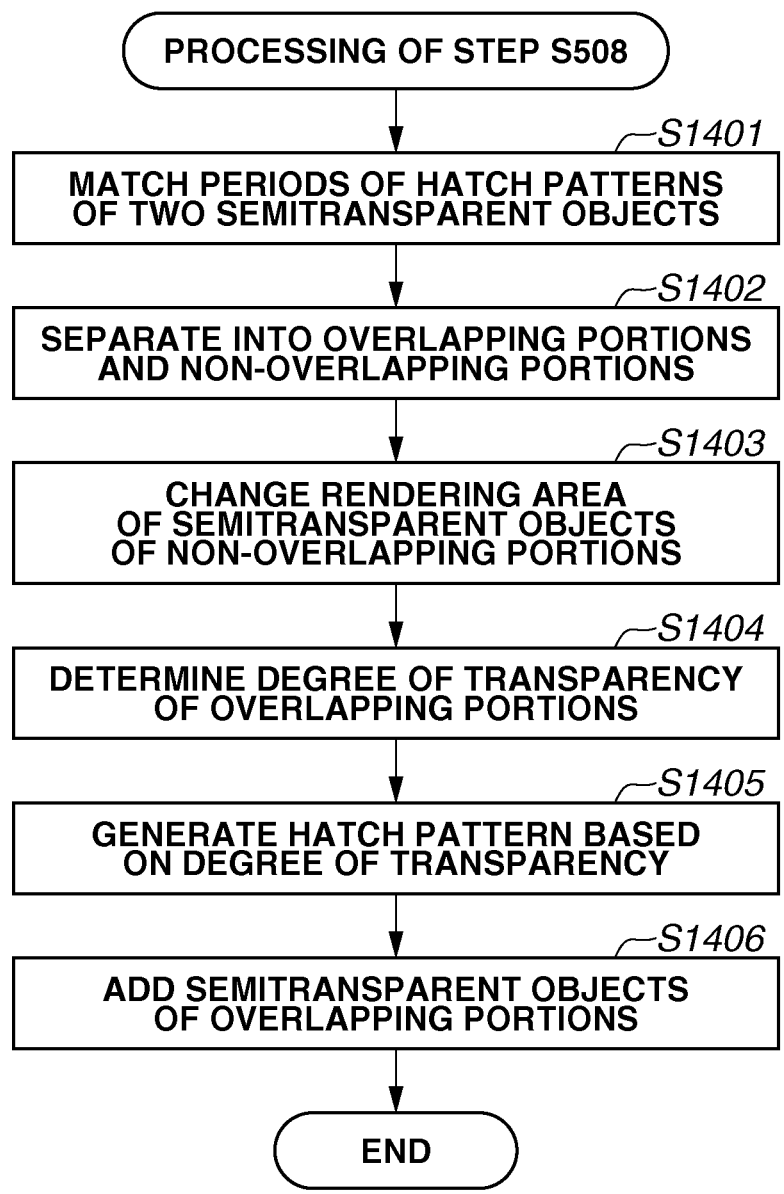

FIG.15
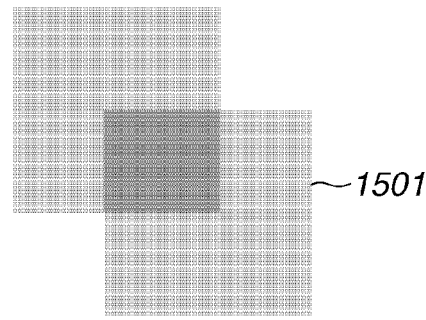
PC SCREEN
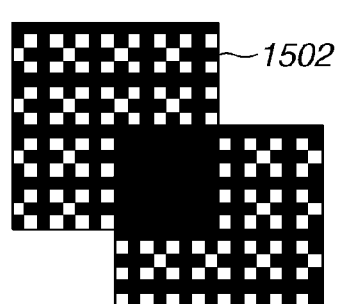 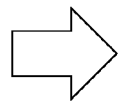 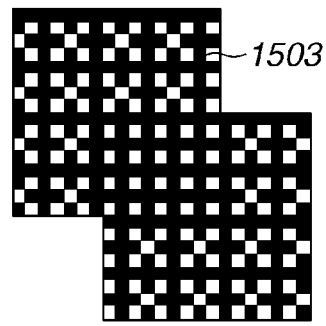
RENDERING RESULT
(NO APPLICATION OF
PRESENT INVENTION)
RENDERING RESULT
(APPLICATION OF
PRESENT INVENTION)

IMAGE PROCESSING APPARATUS, INFORMATION PROCESSING METHOD, AND STORAGE MEDIUM FOR PROCESSING RENDERING DATA INCLUDING A PIXEL PATTERN FOR REPRESENTING A SEMITRANSPARENT OBJECT

BACKGROUND OF THE INVENTION

Field of the Invention

The present invention generally relates to information processing and, more particularly, to an information processing apparatus, information processing method, storage medium, and to semitransparent objects.

Description of the Related Art

A hatch pattern to express a semitransparent state by an application or an operating system (OS) graphics function on a host computer is conventionally used. An object expressed in a semitransparent state using such a hatch pattern (i.e., an object including the hatch pattern) is called a semitransparent object. Such semitransparent objects are known to interfere with a dither pattern, causing image quality to deteriorate in various ways. Accordingly, a proposal has been made for remedying such interference (see Japanese Patent Application Laid-Open No. 2007-118199).

However, image quality also deteriorates when a plurality of semitransparent objects are rendered overlapping each other. For example, in Microsoft PowerPoint™, image quality is substantially deteriorated when a semitransparent state is designated for a three-dimensional object or an object to which a shadow has been added, since two semitransparent objects having the same position, the same size, and the same degree of transparency are output.

SUMMARY OF THE INVENTION

According to an aspect of the present disclosure, an apparatus includes a determination unit and a control unit. The determination unit is configured to determine whether rendering positions of two pieces of rendering data, each representing a semitransparent state by including pixels that are to be rendered by a rendering unit and pixels that are not to be rendered, overlap. The control unit is configured to, if it is determined by the determination unit that the rendering positions of the two pieces of rendering data overlap, perform control such that one of the two pieces of rendering data is not rendered by the rendering unit.

According to another aspect of the present disclosure, a method includes determining whether rendering positions of two pieces of rendering data, each piece representing a semitransparent state by including pixels that are to be rendered by a rendering unit and pixels that are not to be rendered, overlap. The method also includes, if it is determined that the rendering positions of the two pieces of rendering data overlap, performing control such that one of the two pieces of rendering data is not rendered by the rendering unit.

According to another aspect of the present disclosure, a non-transitory storage medium stores a program that makes a computer determine whether a rendering position of two pieces of rendering data in a semitransparent state, which include pixels that are to be rendered by a rendering unit and pixels that are not to be rendered, overlaps, and if it is determined that the rendering position of the two pieces of rendering data overlap, perform control such that one of the two pieces of rendering data is not rendered by the rendering unit.

Further features of the present disclosure will become apparent from the following description of exemplary embodiments with reference to the attached drawings.

BRIEF DESCRIPTION OF THE DRAWINGS

FIG. 2 illustrates an example of a warning processing display.

FIG. 7 illustrates a flowchart illustrating warning display processing.

FIG. 11 illustrates an example illustrating in detail image quality deterioration caused by interference between semitransparent objects.

FIG. 12 illustrates an example of a method for remedying image quality deterioration when semitransparent objects partially overlap each other.

FIG. 14 illustrates a flowchart of processing for remedying image quality deterioration when semitransparent objects partially overlap each other.

FIG. 15 illustrates an example in which semitransparent objects partially overlap each other.

DESCRIPTION OF THE EMBODIMENTS

Various exemplary embodiments, features, and aspects of the disclosure will be described in detail below with reference to the drawings.

Figure 1:
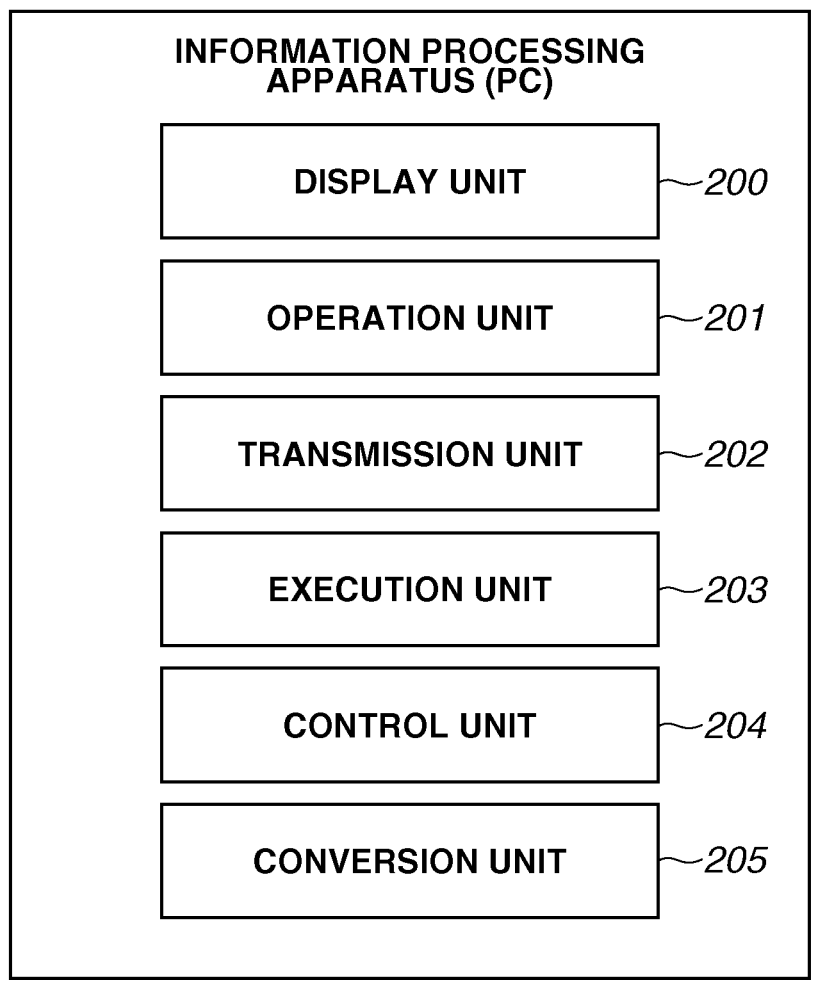
FIG. 1 is a block diagram illustrating a configuration of a system according to an exemplary embodiment of the present disclosure.

A first exemplary embodiment will now be described. FIG. 1 is a block diagram of an information processing apparatus (personal computer (PC)) according to the present exemplary embodiment. This information processing apparatus (PC) is configured with a display unit 200, an operation unit 201, a transmission unit 202, an execution unit 203, a control unit 204, and a conversion unit 205. A user operates the information processing apparatus (PC) by operating the operation unit 201 (e.g., a keyboard or a mouse) based on visual information on the display unit 200 (e.g., a liquid crystal display). The transmission unit 202, which is a piece of hardware capable of transmitting page description language (PDL) data, is configured with a known communication interface. The execution unit 203, the control unit 204, and the conversion unit 205 are configured with a central processing unit (CPU), a random-access memory (RAM), and a read-only memory (ROM). As used herein, the term "unit" generally refers to any combination of software, firmware, hardware, or other component that is used to effectuate a purpose.

Figure 3:
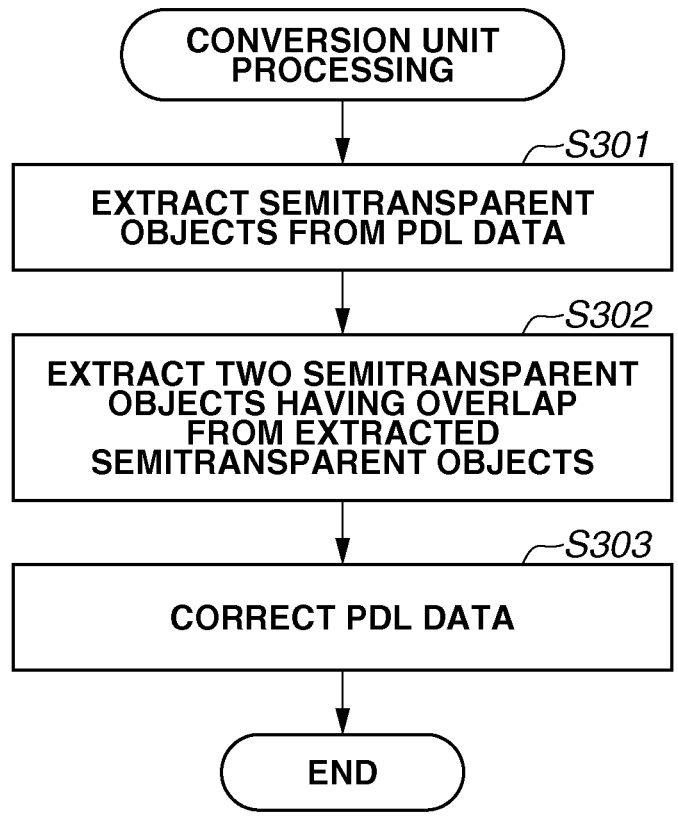
FIG. 3 illustrates a flowchart of overall conversion processing.

The execution unit 203 is capable of executing Microsoft PowerPoint™, the control unit 204 is capable of executing PDL generation processing, and the conversion unit 205 is capable of executing the processing illustrated in FIG. 3. This is because the ROM includes a Microsoft PowerPoint™ program, a PDL data generation processing program, and a program that executes the processing illustrated in FIG. 3. Microsoft PowerPoint™, the PDL data generation processing, and the processing illustrated in FIG. 3 are executed by the CPU loading and executing these programs in the RAM as necessary.

If printing is executed while the execution unit 203 is running Microsoft PowerPoint™, the object for which a semitransparent state was designated is transferred to the conversion unit 205 as information about the hatch pattern, color (the color with which the ON pixels of the hatch pattern are painted), rendering position, and rendering area. The conversion unit 205 converts the hatch pattern, the color, the rendering position, and the rendering area transferred from the execution unit 203 into PDL data that can be processed by an image forming apparatus (e.g., a printer), and stores the converted PDL data in the RAM. ON pixels are also referred to as non-transparent pixels, and OFF pixels are also referred to as transparent pixels. The conversion unit 205 reads the PDL data from the RAM, performs the conversion processing described below with reference to FIG. 3, and transmits the converted data to the transmission unit 202. The transmission unit 202 transmits the PDL data transferred from the conversion unit 205 to the image forming apparatus.

FIG. 3 illustrates the main processing flow that is executed by the conversion unit 205 according to the present exemplary embodiment. Before starting the respective processes in this processing flow, the control unit 204 transfers the PDL data to the conversion unit 205. The conversion unit 205 reads that PDL data and executes the processing flow illustrated in FIG. 3.

In step S301, the conversion unit 205 identifies all the objects included in the PDL data, and determines whether each identified object is a semitransparent object. Then, the conversion unit 205 forms a list of the objects determined to be a semitransparent object (the formation of this list is called semitransparent object extraction).

Figure 4:
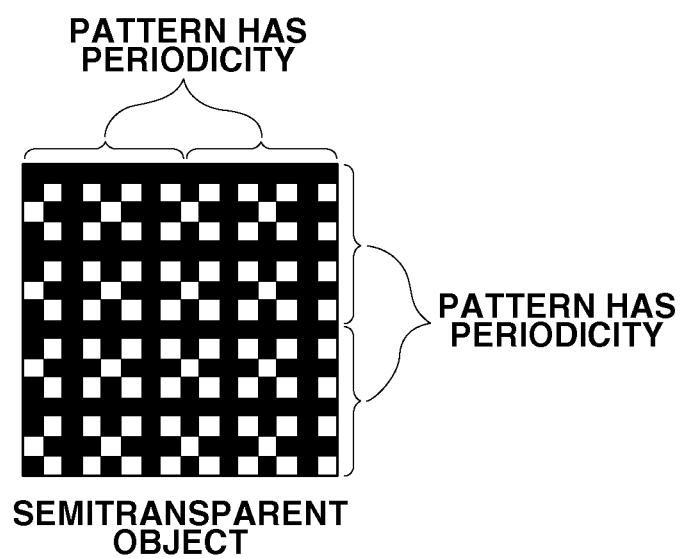
FIG. 4 illustrates an example of a hatch pattern included in a semitransparent object.

The determination whether an object is a semitransparent object is performed based on whether an object includes a hatch pattern. The method for determining whether a pattern included in an object is the hatch pattern may be performed by determining whether the pattern has periodicity, as illustrated in FIG. 4.

In step S302, the conversion unit 205 refers to the semitransparent objects extracted in step S301, and if there are two semitransparent objects that have an overlap, executes the processing of step S303.

In step S303, the conversion unit 205 executes correction of the PDL data so that the hatch patterns of the two semitransparent objects that have an overlap do not interfere with each other.

Figure 5:
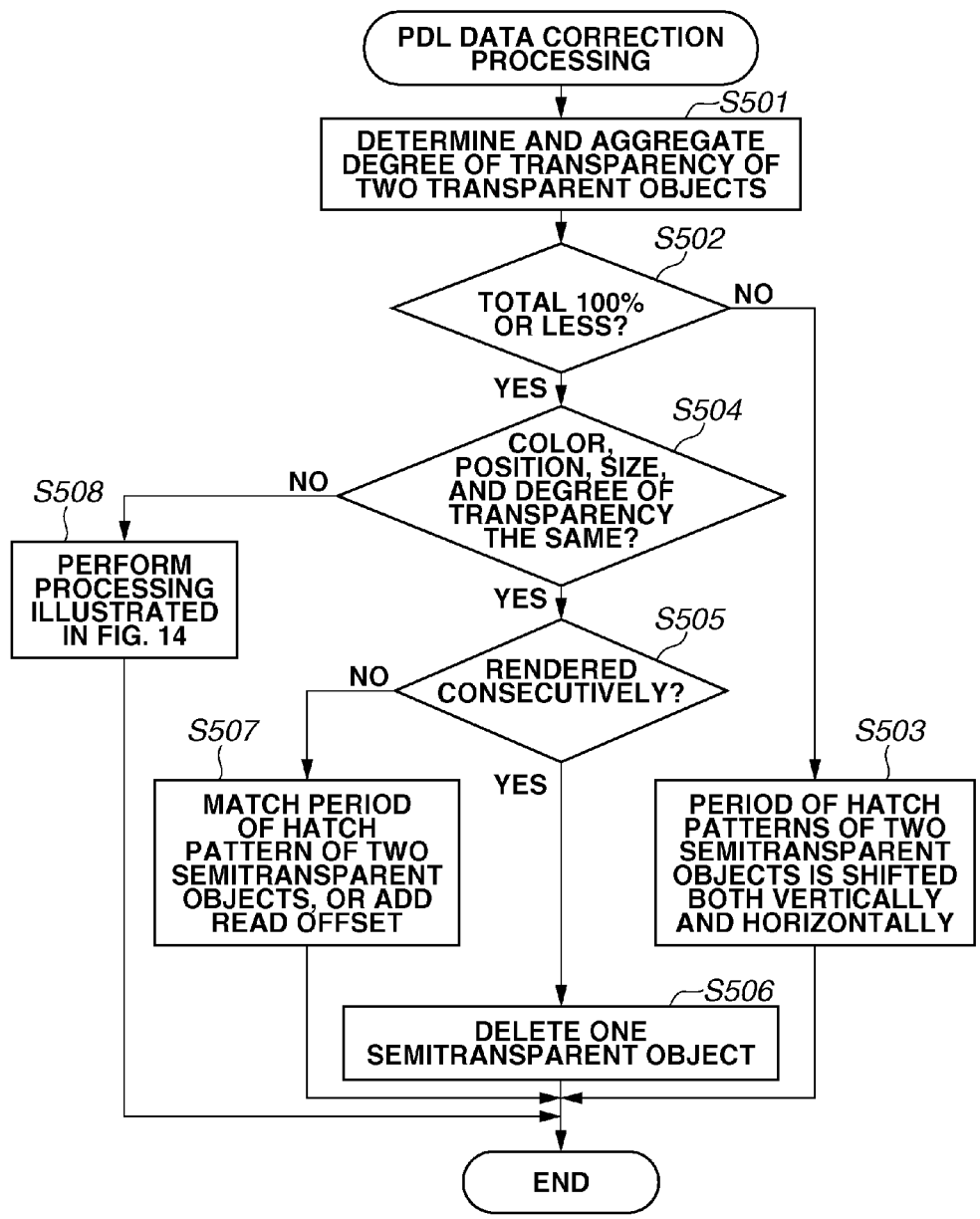
FIG. 5 illustrates a detailed flowchart of conversion processing.

FIG. 5 illustrates a detailed flow of the processing performed in step S303 of FIG. 3.

Figure 6:
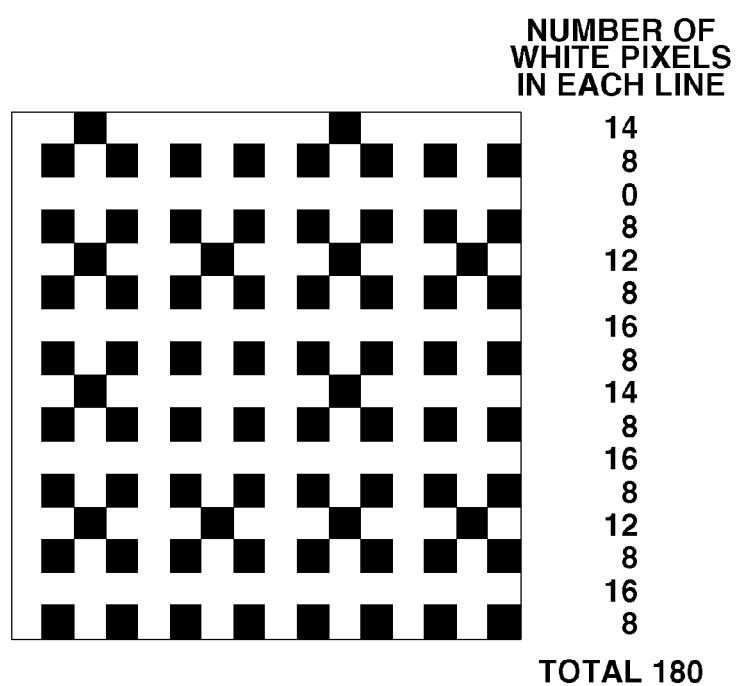
FIG. 6 illustrates an example of a method for calculating a degree of transparency.

In step S501, the conversion unit 205 determines and aggregates the degree of transparency of the two semitransparent objects having an overlap. As illustrated in FIG. 6, the degree of transparency can be determined based on the ratio of OFF (white) pixels to all the pixels in the hatch pattern. Since the OFF pixels are pixels which the background passes through, the more OFF pixels, the higher the degree of transparency. FIG. 6 illustrates a semitransparent object having 180 OFF pixels among a total of 256 pixels, so that the degree of transparency is 70%.

Figure 8A:
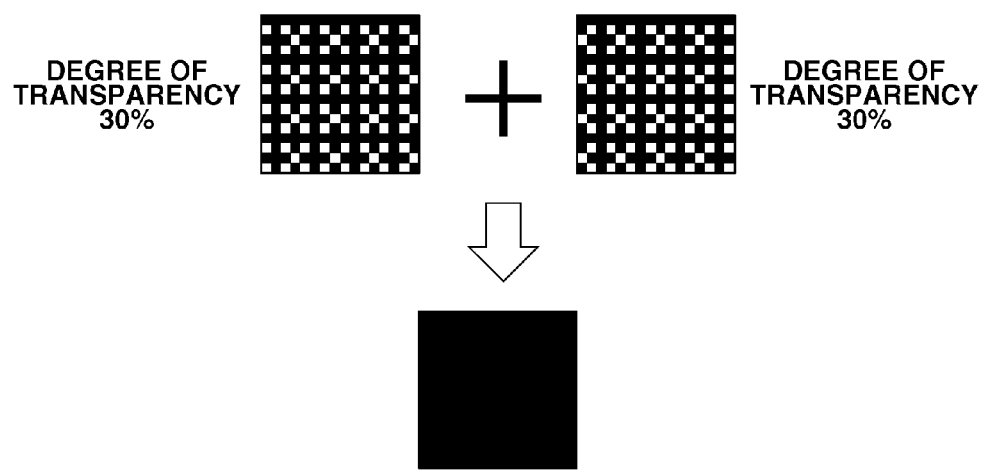
FIGS. 8A and 8B illustrate examples of image quality deterioration caused by interference between semitransparent objects (in the cases of a transparency degree of 30% and a transparency degree of 70%, respectively).
Figure 8B:
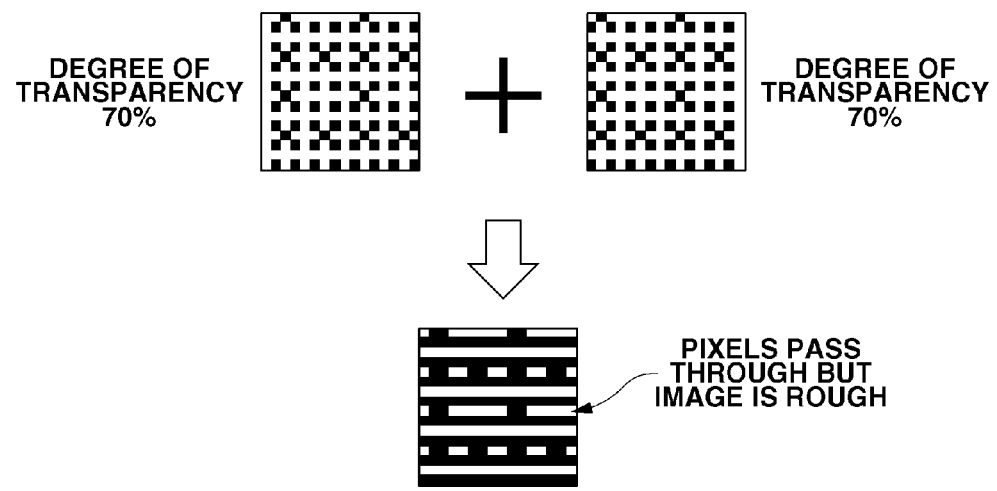

In step S502, the conversion unit 205 splits the subsequent processing based on whether the total degree of transparency determined in step S501 is 100% or less. As illustrated in FIG. 8, this is performed because the image quality deterioration phenomenon that is caused by hatch pattern interference is different depending on the degree of transparency. As illustrated in FIG. 8A, when a plurality of semitransparent objects having a low degree of transparency (e.g., having a degree of transparency of 30%) overlap, since there are a lot of ON (black) pixels (pixels which the background does not pass through) included in each hatch pattern, a phenomenon occurs in which the background cannot be seen at all (i.e., the background does not pass through). In contrast, as illustrated in FIG. 8B, when a plurality of semitransparent objects having a high degree of transparency (e.g., having a degree of transparency of 70%) overlap, since there are few ON pixels included in each hatch pattern, the background can be partially seen. However, a phenomenon occurs in which the background becomes blurry due to interference between the hatch patterns.

First, countermeasures against the phenomenon in FIG. 8B will be described. To avoid the phenomenon illustrated in FIG. 8B in which the background passes through but the image is blurry (NO in step S502) (i.e., a case in which the total value is greater than 100%), in step S503, the conversion unit 205 corrects the PDL data so that the period in the hatch patterns of the two semitransparent objects is shifted in both the horizontal direction and the vertical direction. The details of the processing for shifting the period of the hatch patterns will be described with reference to FIG. 11.

In a hatch pattern, lines having a lot of OFF pixels and lines having a lot of ON pixels follow each other periodically. As illustrated by hatch pattern 1101 and hatch pattern 1102, if hatch patterns in which lines having a lot of ON pixels (i.e., the line period and the phase match) overlap each other, a line appears that has a very large number of ON pixels or OFF pixels, so that the image is blurry (refer to the rendering result of FIG. 8B). Accordingly, by shifting the period of lines having a lot of ON pixels like hatch patterns 1103 and 1104, a clean rendering result can be obtained in which the ON pixels and the OFF pixels are uniformly aligned in each line like hatch pattern 1105.

Figure 10:
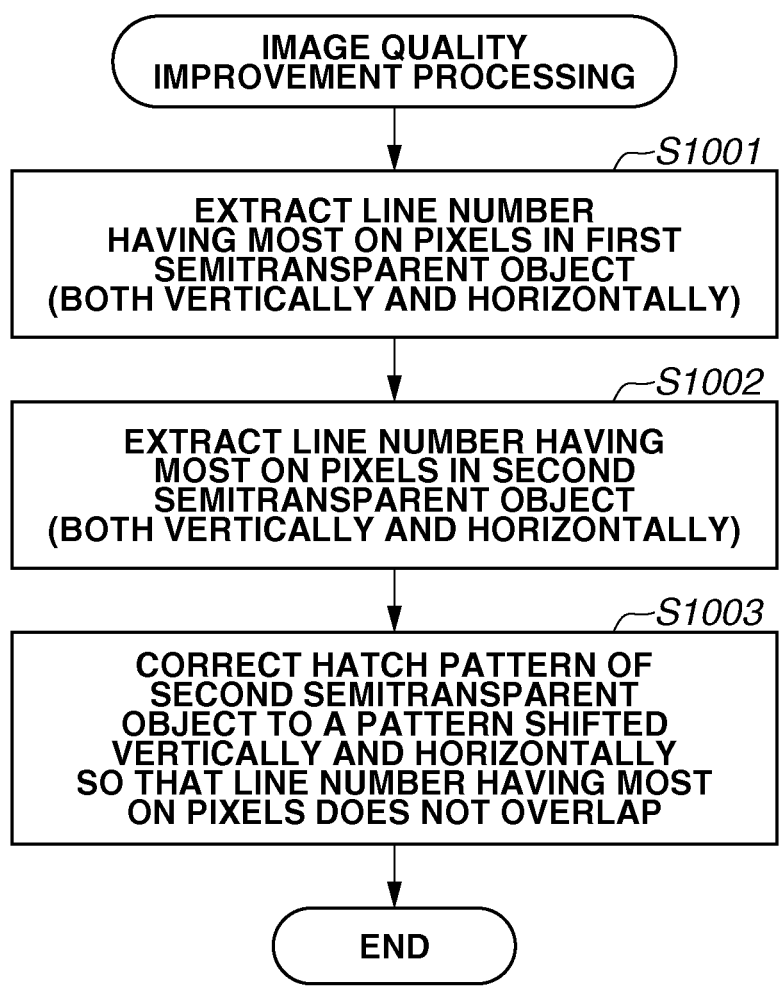
FIG. 10 illustrates a flowchart of processing for remedying image quality deterioration caused by interference between semitransparent objects.

Next, the flow of processing performed in step S503 will be described in more detail with reference to FIG. 10.

In step S1001, the conversion unit 205 extracts a line number of a line having a lot of ON pixels in the hatch pattern of a first semitransparent object. In the present exemplary embodiment, the line number indicates the order in the sub-scanning direction of the lines extending in the main scanning direction (the main and sub directions may be reversed).

Similarly, in step S1002, the conversion unit 205 extracts a line number of a line having a lot of ON pixels in the hatch pattern of a second semitransparent object. The line having a lot of ON pixels is determined by, for example, aggregating the number of ON pixels of the line in a hatch pattern, and taking the line having the most ON pixels among those lines. For the hatch pattern 1103 illustrated in FIG. 11, the highest number of ON pixels among the lines is eight, so that lines 2, 4, 8, 10, 12, 14, and 16, which have eight ON pixels, are extracted. In step S1003, the conversion unit 205 corrects the hatch pattern of the second semitransparent object vertically and horizontally so that the line numbers of the lines having a lot of ON pixels of the two semitransparent objects do not overlap. Based on the above processing, an effect can be obtained that remedies the phenomenon of image quality deterioration due to interference between hatch patterns when semitransparent objects overlap.

Figure 9A:
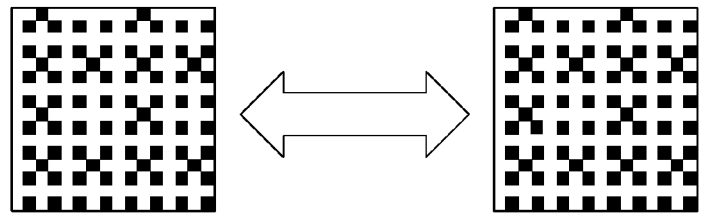
FIGS. 9A, 9B, 9C, and 9D illustrate examples 1 to 4, respectively, of period shift between semitransparent objects.
Figure 9B:
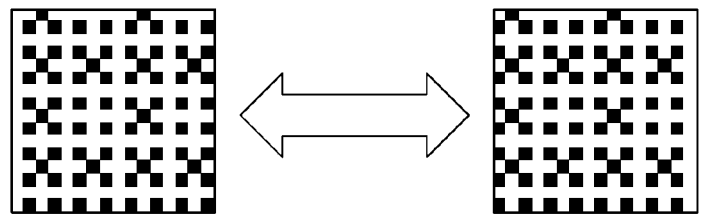
Figure 9C:
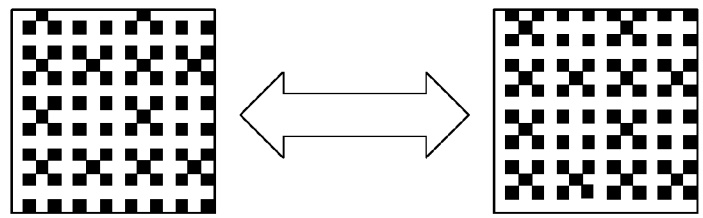
Figure 9D:
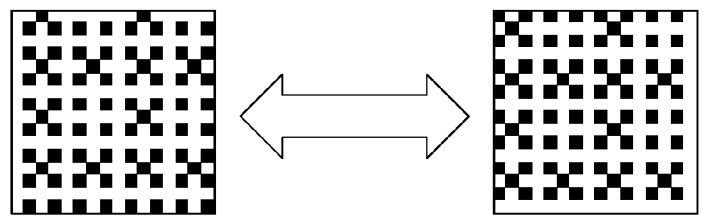

The period and phase of two hatch patterns will now be further described with reference to FIGS. 9A through 9D. FIG. 9A illustrates a state in which two hatch patterns completely match, so that in this case their period and phase also match. FIG. 9B illustrates a case in which one of the hatch patterns has been shifted by one pixel in the horizontal (main scanning) direction. In this state, although the periods in the horizontal direction match, the horizontal direction is out of phase. FIG. 9C illustrates a case in which one of the hatch patterns has been shifted by one pixel in the vertical (sub-scanning) direction. In this state, although the periods of the vertical direction match, the vertical direction is out of phase. FIG. 9D illustrates a case in which one of the hatch patterns has been shifted by one pixel in both the horizontal direction and the vertical direction. In this state, although the periods of the horizontal direction and the vertical direction match, the horizontal direction and the vertical direction are both out of phase.

Next, a method for avoiding the phenomenon illustrated in FIG. 8A, in which the background does not pass through (YES in step S502, i.e., case in which the total value is 100% or less), will be described. The reason why the background is not visible (i.e., the background does not pass through) is that the hatch patterns of the two semitransparent objects are out of phase. Accordingly, if the degree of transparency is low (when the total value is 100% or less), the ON pixel concentration stays dense even if the phases of the hatch patterns are shifted, so that the background is still not visible. Therefore, when the degree of transparency is low, the phenomenon in which the background does not pass through is remedied by making the hatch patterns of the two semitransparent objects completely match.

Figure 13A:
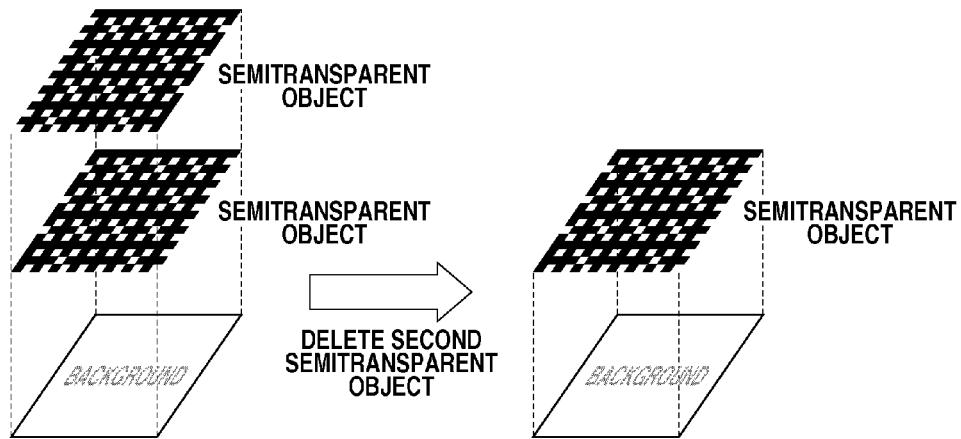
FIGS. 13A and 13B illustrate examples of the order in which semitransparent objects overlap.
Figure 13B:
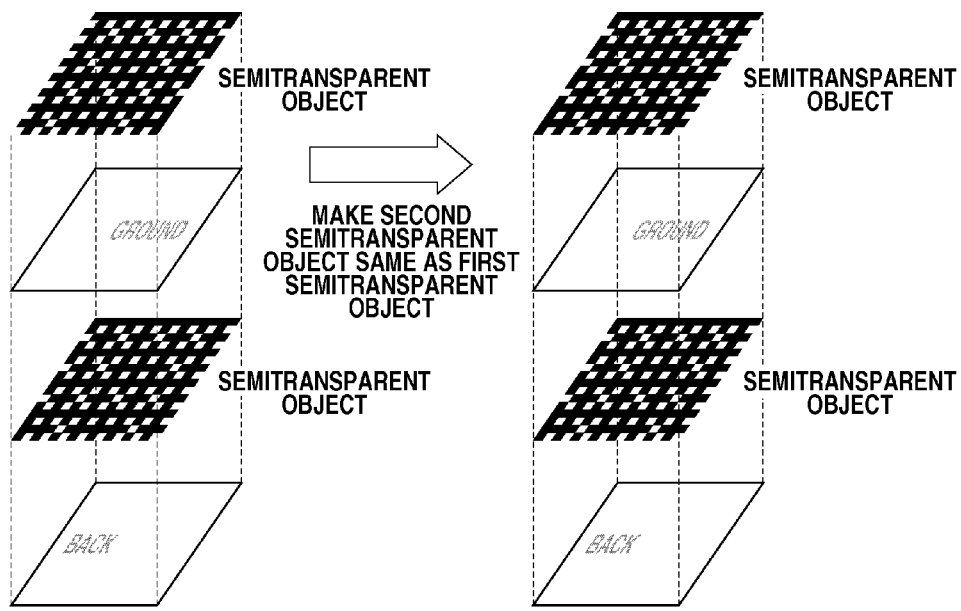

If the hatch patterns of the semitransparent objects are made to completely match, as illustrated in FIG. 13A, it is no longer necessary to render one of the semitransparent objects if when the semitransparent objects are rendered consecutively. Consequently, the second semitransparent object may be deleted (this allows processing to be speeded up because unnecessary processing is eliminated). However, as illustrated in FIG. 13B, if a separate object is sandwiched between the two semitransparent objects, it is necessary to match the hatch patterns of the two semitransparent objects without deleting them. To realize this processing, in step S504, the conversion unit 205 determines whether the two semitransparent objects have the same color, the same position, the same size, and the same degree of transparency. If even one of the color, the position, the size, and the degree of transparency is different (NO in step S504), this means that the hatch patterns cannot simply match, and the processing proceeds to step S508. The processing performed in this case will be described separately in more detail with reference to FIGS. 15, 12, and 7. The degree of transparency does not have to be a perfect match. This is because people cannot visually distinguish a difference in the degree of transparency of less than a few percent. If the hatch patterns have the same color, the same position, the same size, and the same (more correctly, roughly the same) degree of transparency (YES in step S504), and if the two semitransparent objects are rendered consecutively (YES in step S505), in step S506, the conversion unit 205 deletes the second semitransparent object from the PDL data.

On the other hand, if the two semitransparent objects are not rendered consecutively (NO in step S505), in step S507, the conversion unit 205 makes the hatch pattern of one of the semitransparent objects completely match the hatch pattern of the other semitransparent object. The hatch patterns of the two semitransparent objects can be made to completely match by copying the hatch pattern of one of the semitransparent objects onto the hatch pattern of the other semitransparent object. Further, when utilizing a printer having an advanced rendering function, copying processing may be unnecessary since the hatch patterns can just be read and offset. Offsetting is a process in which rather than reading from the top left of the hatch pattern, the hatch pattern is read from, for example, line 3, row 3 of the hatch pattern. Since the details for reading a hatch pattern with an offset are known, a description thereof will be omitted here. Based on the above processing, the phenomenon in which the background is completely lost from view due to interference between hatch patterns when semitransparent objects overlap can be remedied, so that the background is visible through the semitransparent objects.

The processing will now be described which is performed in step S508 if it is determined in step S504 that the two semitransparent objects do not have the same color, the same position, the same size, and the same (more correctly, substantially the same) degree of transparency.

If the position of the two semitransparent objects is different, like objects 1501 in FIG. 15, the hatch patterns of the semitransparent objects are simply made to completely match as was performed in step S507. Consequently, the semitransparent objects change from objects 1502, in which the portion where the semitransparent objects overlap does not let the background through, to objects 1503, in which that portion does let the background through. However, it is not possible to reproduce the semitransparent objects such that the portion where they overlap is densely displayed on the PC like the objects 1501. Accordingly, as illustrated in FIG. 12, the semitransparent objects are divided into semitransparent objects 1601 and 1603, which are not overlapping portions, and a semitransparent object 1602, which is an overlapping portion. Further, the through-pattern of the semitransparent object 1602 is made to have a lower degree of transparency than that of the semitransparent objects 1601 and 1603. Specifically, if the semitransparent objects 1601 and 1603 have a degree of transparency of 30%, the semitransparent object 1602 can have a degree of transparency of 9%, which is 30% of 30%. A detailed flow of the processing performed in step S508 is illustrated in the flowchart of FIG. 14. In step S1401, the conversion unit 205 matches the periods of the hatch patterns of the two semitransparent objects. Then, in step S1402, the conversion unit 205 separates the semitransparent objects into overlapping portions and non-overlapping portions. The rendering of the non-overlapping portions is realized by changing the original rendering areas of the two semitransparent objects. Consequently, in step S1403, the conversion unit 205 redraws the objects so that the rendering areas of the two semitransparent objects in the PDL data except the overlapping portions are rendered. Regarding the overlapping portion, a new semitransparent object is added to the PDL data. Consequently, in step S1404, the conversion unit 205 determines the degree of transparency of the overlapping portion (9% in the example illustrated in FIG. 12), and in step S1405 generates a hatch pattern based on the degree of transparency determined in step S1404. Then, in step S1406, the conversion unit 205 adds a new semitransparent object to the PDL data by utilizing the hatch pattern generated in step S1405. Based on the above processing, an effect can be realized in which the degree of transparency of the overlapping portion of the semitransparent objects is lower than the original degree of transparency.

In the first exemplary embodiment, image quality deterioration is remedied by correcting semitransparent objects with the conversion unit 205 in the execution unit 203 when semitransparent objects overlap. A second exemplary embodiment will be described below. Instead of correcting the PDL data, the user can be warned that semitransparent objects overlap, as illustrated by the warning screen 1801 in FIG. 2, to prevent printing from being executed if image quality has deteriorated. In this case, the flow of processing of the conversion unit 205 is as illustrated in FIG. 7. If semitransparent objects overlap, in step S1701, the conversion unit 205 displays the warning screen 1801 on a display 8 (not illustrated). In step S1702, the conversion unit 205 determines whether an instruction for cancellation or continuation of printing has been input by the user. If it is determined that cancellation of printing has been input (YES in step S1702), in step S1703, the conversion unit 205 discards the PDL data. Based on this processing, the user can learn in advance that semitransparent objects overlap, and prevent printing in advance. Thus, this processing has the effect of preventing unnecessary printing.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-078433 filed Apr. 4, 2013, which is hereby incorporated by reference herein in its entirety.

What is claimed is:

1. An apparatus comprising:
   a determination unit configured to determine whether rendering positions of two semitransparent objects respectively represented by two pieces of rendering data overlap, each rendering data having a pixel pattern including pixels to be painted with a color of a semitransparent object and pixels to be painted with a color of a background of the semitransparent object; and
   a control unit configured to, on a basis of at least a determination that the rendering positions overlap, perform control such that rendering based on the pixel pattern of one of the two pieces of rendering data is not performed by a renderer,
   wherein the determination unit and the control unit are implemented by one or more processors.

2. The apparatus according to claim 1, wherein the control unit is configured to, on a basis of at least the determination that the rendering positions overlap, perform control such that the other piece of rendering data is rendered by the renderer.

3. The apparatus according to claim 1, wherein the control unit is configured to, on a basis of at least the determination that the rendering positions overlap, perform control such that the other piece of rendering data is rendered twice by the renderer.

4. The apparatus according to claim 1, wherein the control unit is configured to, on a basis of at least the determination that the rendering positions overlap, perform control such that the one piece of rendering data that is not to be rendered is deleted, and the other piece of rendering data is added in place of the deleted piece of rendering data.

5. The apparatus according to claim 1, wherein the apparatus does not comprise the renderer.

6. The apparatus according to claim 1, wherein the determination unit and the control unit are implemented by executing a program by the one or more processors of the apparatus, and
   wherein the renderer is included in a printing apparatus.

7. The apparatus according to claim 1, wherein the control unit is configured to, on a basis of at least the determination that the rendering positions overlap, not transmit the one piece of rendering data to the renderer, and transmit the other piece of rendering data to the renderer.

8. The apparatus according to claim 7, wherein the control unit is configured to, on a basis of at least the determination that the rendering positions overlap, delete the one piece of rendering data from page description data including the two pieces of rendering data, and transmit the page description data to the renderer after the deletion.

9. The apparatus according to claim 1, wherein the control unit is configured to, on a basis of at least the determination that the rendering positions overlap, if the one piece of rendering data is rendered by overlapping the one piece with the other piece of rendering data, correct the one piece of rendering data such that there is one or more pixels that are not rendered.

10. The apparatus according to claim 1, wherein the control unit is configured to, on a basis of at least the determination that the rendering positions do not overlap, perform control such that the two pieces of rendering data are rendered by the renderer.

11. The apparatus according to claim 1, wherein the rendering data representing a semitransparent state is data having a predetermined number of horizontal and vertical pixels.

12. The apparatus according to claim 1, wherein the rendering data includes the rendering position of the semitransparent object, the color of the semitransparent object and the pixel pattern corresponds to a degree of transparency of the semitransparent object.

13. The apparatus according to claim 1, wherein positions of a part of the pixels to be painted with the color of one of the two semitransparent objects and positions of a part of the pixels to be painted with the color of a background of the other of the two semitransparent objects is the same.

14. The apparatus according to claim 1,
wherein the determination unit is configured to determine whether the two semitransparent objects have consecutive rendering order,
wherein the control unit is configured to perform the control, on a basis of at least the determination that the rendering positions overlap and the determination that the two semitransparent objects have the consecutive rendering order.

15. A method comprising:
determining whether rendering positions of two semitransparent objects respectively represented by two pieces of rendering data overlap, each rendering data having a pixel pattern including pixels to be painted with a color of a semitransparent object and pixels to be painted with a color of a background of the semitransparent object; and
on a basis of at least a determination that the rendering positions overlap, performing control such that rendering based on the pixel pattern of one of the two pieces of rendering data is not performed.

16. A non-transitory storage medium that stores a program that makes a computer:
determine whether rendering positions of two semitransparent objects respectively represented by two pieces of rendering data overlap, each rendering data having a pixel pattern including pixels to be painted with a color of a semitransparent object and pixels to be painted with a color of a background of the semitransparent object; and
on a basis of at least a determination that the rendering positions overlap, perform control such that rendering based on the pixel pattern of one of the two pieces of rendering data is not performed.

* * * * *